A. M. CHASE.
REAR AXLE CONSTRUCTION.
APPLICATION FILED NOV. 15, 1913.

1,245,680.

Patented Nov. 6, 1917.
2 SHEETS—SHEET 1.

WITNESSES:
Chas. H. Young.
F. B. Pickard.

INVENTOR.
Avrin M. Chase,
BY
Parson Hall Bodell.
ATTORNEYS.

A. M. CHASE.
REAR AXLE CONSTRUCTION.
APPLICATION FILED NOV. 15, 1913.
1,245,680.
Patented Nov. 6, 1917.
2 SHEETS—SHEET 2.
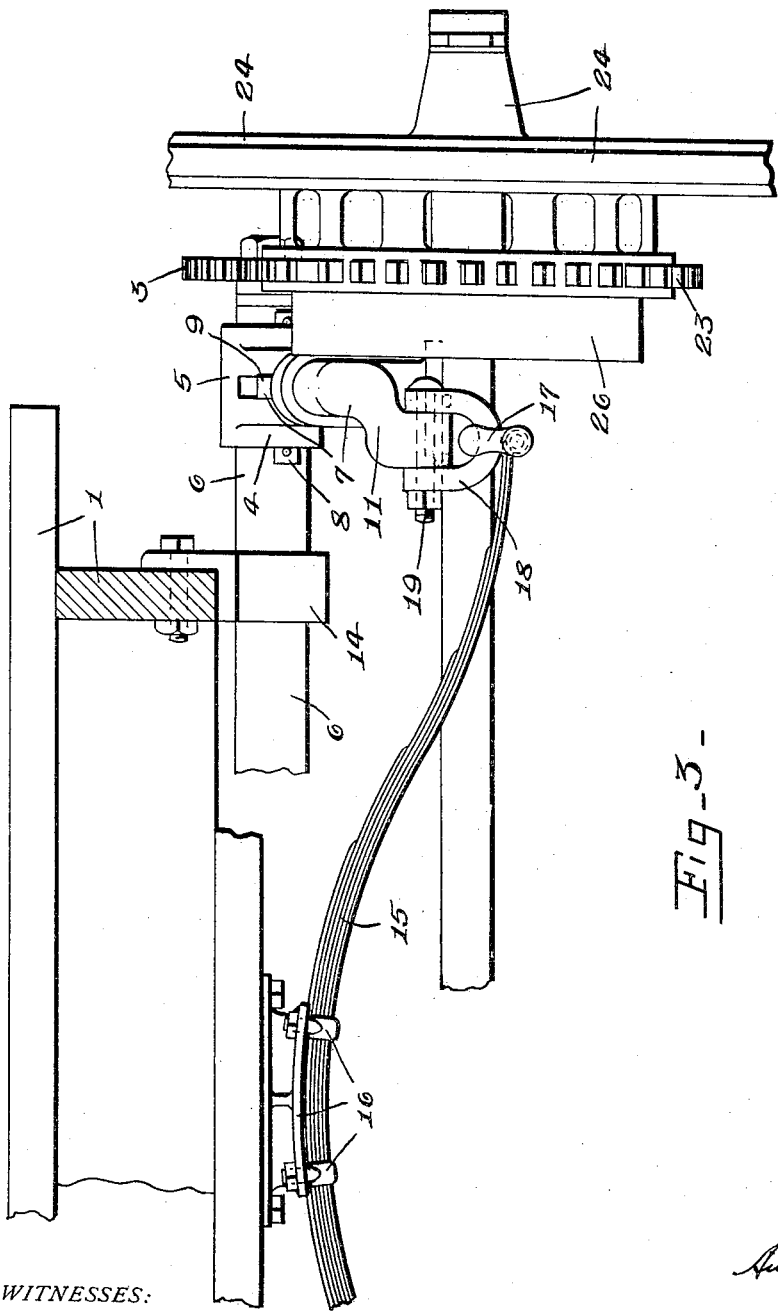
WITNESSES:
INVENTOR.
BY
ATTORNEYS.

UNITED STATES PATENT OFFICE.

AURIN M. CHASE, OF SYRACUSE, NEW YORK.

REAR-AXLE CONSTRUCTION.

1,245,680. Specification of Letters Patent. Patented Nov. 6, 1917.

Application filed November 15, 1913. Serial No. 801,256.

*To all whom it may concern:*

Be it known that I, AURIN M. CHASE, a citizen of the United States, and a resident of Syracuse, in the county of Onondaga and State of New York, have invented a certain new and useful Rear-Axle Construction, of which the following is a specification.

This invention has for its object the production of a rear axle construction for motor vehicles, which is particularly simple in construction and highly efficient in use; and the invention consists in the novel combinations and constructions hereinafter set forth and claimed.
In describing this invention, reference is had to the accompanying drawings in which like characters designate corresponding parts in all the views.

Figures 1, 2:
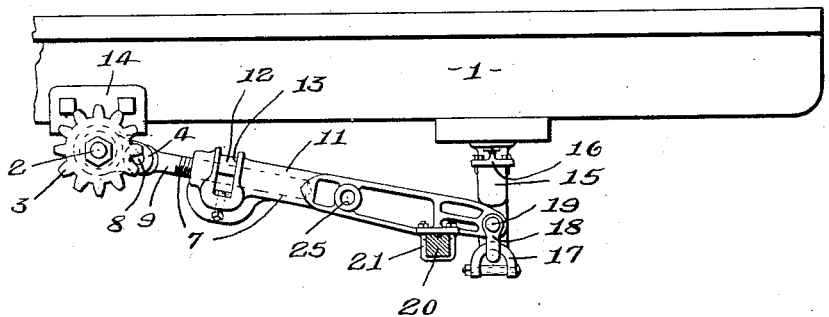
Figure 1 is an elevation of the rear portion of a car body provided with my rear axle construction, the rear wheels and other parts being removed and the axle being shown in section.
Fig. 2 is an enlarged inner face view of this axle construction, partly in section and partly broken away, the contiguous part of one of the rear wheels being shown.

Fig. 3 is a rear end elevation of parts seen in Fig. 2, the car body being included.
This rear axle construction comprises, generally, an axle carrier on each side of the car body and including a strut rod pivoted at one end to a part fixed relatively to the car body and inclining downwardly and rearwardly therefrom, a spring interposed between the rear end of the strut rod and the car body, and a rear axle secured near each end to one of the strut rods.

I have here shown my invention as embodied in a motor car in which the rear wheels rotate on the axle and are driven through flexible connections as chains from opposite ends of a jack shaft extending transversely of the car body and journaled in means as a casing fixed to the car body. Each axle carrier includes a part mounted concentric with the jack shaft and fixed to said supporting means and a strut or radius rod pivoted at one end to said part, and the spring is connected to the rear end of the strut or radius rod while the axle is preferably connected to the strut or radius rod at a point in front of and spaced apart from the point of connection of the spring and the strut rod.

1 is the car body, 2 is the jack or driving shaft extending transversely of the car body and having means at its opposite ends as sprocket wheels 3 for transmitting the motion of the shaft, it being understood that the jack shaft is in two sections, which are connected by a differential gear and that the power of the shaft is transmitted to the rear wheels from the outer ends of the shaft sections and that there is a rear axle carrier on each side of the car.

Each carrier comprises a part including a rearwardly extending arm 4 having a bearing 5 fixed on the casing 6 of the jack shaft 2, and a second arm 7, or strut rod as it is called, pivoted at 8 to the arm 4 and normally arranged in alinement therewith, the strut rod 7 including two links adjustable lengthwise relatively to each other, one of these links 9 being pivoted at 8 to the arm 4 and extending into a lengthwise passage 10 in the other link 11 and through an adjusting nut 12 carried by the link 11 and having its threaded opening alined with the passage 10, this adjusting nut being located in a suitable recess 13 extending transversely of and intersecting the passage 10, which recess holds it from axial movement. The casing 6 of the jack shaft is of the usual construction and is fixed to the car body, that is, it does not rotate as will be understood by those skilled in the art. The casing 6 is secured to the car body by a bracket 14 located on each side of the car body and secured to the sill thereof in any suitable manner.

15 is the spring, here shown as a leaf spring, extending transversely of the rear end of the car body and flexibly connected at each end to one of the rear axle carriers, as shown in Fig. 3, and fixedly secured between its ends at 16 to the car body. As here shown, each end of the leaf spring is pivoted to a shackle 17 linked with another shackle 18 which in turn is pivoted at 19 to the rear end of the strut rod 7.

20 is the rear axle supported near each end by one of the carriers between the ends of the carrier and in front of the pivot 19 by which the spring is supported from the strut rod 7, the axle 20 being connected to the strut rod 7 in front of, and near, the pivot 19. The axle 20 is secured at each end to one of the carriers by means of the U shape clip 21.

The motion of the jack shaft is transmitted to each rear driving wheel by a flexible connection, as a sprocket chain 22 running over each sprocket wheel 3 and a wheel 23 on each rear driving wheel 24 of the vehicle. Each strut rod 7 is provided with a bearing 25 for a lever not shown, which operates the brake band, not shown, which coacts with the drum 26 on the rear wheel 24.

In operation, during the action of the spring 15, the strut rod swings about the pivot 8 and owing to the pivot 8 the rod 7 and the rear axle are readily detached, when necessary, upon removal of the pivot 8 and the pivot 19, without disturbing the parts mounted on the jack shaft. Furthermore, owing to the strut rod 7, a number of parts are eliminated which are commonly used in motor car construction.

What I claim is:—

1. The combination with a vehicle body, of a jack shaft supported from the vehicle body, a gear on said shaft, a wheel, an axle therefor, a second gear connected to the wheel, a flexible driving connection between the gears, a carrier comprising two parts one associated with said shaft and the other pivoted at one end to the first part and rigidly connected to said axle, said second part having its rear end portion projecting beyond the axle, and a transversely extending spring connected to the vehicle body and connected at its end to said projecting end of the second part, substantially as described.

2. The combination with a vehicle body, a wheel and an axle therefor, of a bracket secured to the body, a jack shaft supported by the bracket, a carrier comprising two parts, one of said parts being rigid with the bracket and the other including two links, one connected to the rear axle of the vehicle and having at its outer end a lengthwise socket intersected by a transversely extending slot and the other link having a threaded portion received in said socket, a nut held in the transverse slot and engaging with the threads on the link, a gear on the wheel, a gear on the jack shaft and a flexible driving connection between the gears, substantially as described.

3. The combination with a vehicle body, a wheel, an axle therefor, of a radius rod rigidly fixed to the axle and pivotally connected at its end remote from the axle to means rigid with the vehicle body, and a spring interposed between the vehicle body and the radius rod and being located entirely on one side of the axle, substantially as and for the purpose set forth.

4. The combination with a vehicle body, a wheel and an axle therefor, of a radius rod fixedly secured to the axle near each end thereof and pivotally secured to means rigid with the body at a point remote from the axle, and a spring interposed between the radius rod and the body, the spring extending crosswise of the body and being fixed intermediate of its ends thereto and flexibly secured at each end to the radius rod near the axle, substantially as and for the purpose described.

5. The combination with a vehicle body, a wheel, and an axle therefor, of a radius rod fixedly secured to the axle near each end thereof and pivotally secured to means rigid with the body at a point remote from the axle, the radius rod extending to the rear of the axle, and a spring extending crosswise of the body and fixedly secured thereto between its ends and flexibly secured at each end to the rear end of the radius rod, substantially as and for the purpose specified.

In testimony whereof, I have hereunto signed my name in the presence of two attesting witnesses, at Syracuse, in the county of Onondaga, in the State of New York, this 12th day of November, 1913.

AURIN M. CHASE.

Witnesses:
S. DAVIS,
FREDERIC G. BODELL.